United States Patent
Varshney et al.

(10) Patent No.: US 12,066,910 B2
(45) Date of Patent: Aug. 20, 2024

(54) REINFORCEMENT LEARNING BASED GROUP TESTING

(71) Applicant: Salesforce, Inc., San Francisco, CA (US)

(72) Inventors: Lav Raj Varshney, Champaign, IL (US); Yingbo Zhou, Palo Alto, CA (US); Caiming Xiong, Menlo Park, CA (US); Govardana Sachithanandam Ramachandran, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 375 days.

(21) Appl. No.: 17/498,155

(22) Filed: Oct. 11, 2021

(65) Prior Publication Data

US 2023/0113750 A1    Apr. 13, 2023

(51) Int. Cl.
G06F 11/26 (2006.01)
G06F 11/36 (2006.01)
G06N 20/00 (2019.01)

(52) U.S. Cl.
CPC ........ *G06F 11/261* (2013.01); *G06F 11/3696* (2013.01); *G06N 20/00* (2019.01)

(58) Field of Classification Search
CPC . G06F 11/261; G06F 11/3696; G06N 3/0442; G06N 3/0464; G06N 3/092; G06N 20/00; G06N 7/01
See application file for complete search history.

(56) References Cited

U.S. PATENT DOCUMENTS

| | | | |
|---|---|---|---|
| 11,544,161 B1* | 1/2023 | Yarlagadda | G01D 3/08 |
| 2019/0384257 A1* | 12/2019 | Zhang | G06F 11/008 |
| 2020/0166909 A1* | 5/2020 | Noone | G06N 20/00 |
| 2021/0056430 A1* | 2/2021 | Wu | G06N 3/006 |
| 2021/0057100 A1* | 2/2021 | Neumann | G06F 9/451 |
| 2021/0287109 A1* | 9/2021 | Cmielowski | G06N 20/00 |
| 2022/0156529 A1* | 5/2022 | Kimura | G06T 7/00 |
| 2023/0087837 A1* | 3/2023 | Hwang | G06N 3/048 706/12 |

(Continued)

OTHER PUBLICATIONS

Cover, T.M. et al., "Elements of information theory 2nd edition (wiley series in telecommunications and signal processing)," Jul. 18, 2006, pp. 1-748.

(Continued)

*Primary Examiner* — Matthew M Kim
*Assistant Examiner* — Matthew N Putaraksa
(74) *Attorney, Agent, or Firm* — Haynes and Boone, LLP

(57) ABSTRACT

A system performs group testing on a population of items. The group testing identifies items satisfying particular criteria from a population of items, for example, defective items from the population. The group testing may be performed for software or hardware testing, for testing a human population, for training of deep learning applications, and so on. The system trains a machine learning based model, for example, a reinforcement learning based model to evaluate groups. The model may further determine system dynamics that may represent priors of items. An agent treats the population and groups of items being tested as the environment and performs actions, for example, adjusting the groups. The system also performs a non-adaptive strategy based on monte carlo simulation of tests based on a simulation results.

20 Claims, 8 Drawing Sheets

(56) References Cited

U.S. PATENT DOCUMENTS

2023/0281797 A1* 9/2023 Yamashita .............. G06T 7/001
382/112
2024/0104343 A1* 3/2024 Barfuss ................ G06N 3/0442

OTHER PUBLICATIONS

Du, D-Z. et al., "Combinatorial Group Testing and Its Applications," World Scientific Publishing Company Pte Limited, Series on Applied Mathematics, vol. 12, 2000, pp. 1-323.
Berendsohn, B.A. et al., "Geometric group testing," arXiv:2004.14632, Apr. 30, 2020, pp. 1-23.
Katona, G.O.H., "Combinatorial search problems," Chapter 23: A Survey of Combinatorial Theory, North-Holland, 1973, pp. 285-308.
Klink, P. et al., "Self-Paced Deep Reinforcement Learning," arXiv:2004.11812, Apr. 24, 2020, pp. 1-20.
Liang, W. et al., "Neural Group Testing to Accelerate Deep Learning," arXiv:2011.10704, Nov. 21, 2020, pp. 1-8.
Nikolopoulos, P. et al., "Group testing for connected communities," International Conference on Artificial Intelligence and Statistics PMLR, vol. 130, Apr. 2021, pp. 2341-2349.
Wikipedia, "Sensitivity and specificity," Sep. 14, 2021, pp. 1-12, [Online] [Retrieved on Jan. 21, 2022] Retrieved from the Internet <URL: https://en.wikipedia.org/w/index.php?title=Sensitivity_and_specificity&oldid=1044244047>.

* cited by examiner

REINFORCEMENT LEARNING BASED GROUP TESTING

BACKGROUND

Field of Art

The disclosure relates in general to machine learning based techniques for group testing, and more specifically to use of reinforcement learning for group testing for use in applications such as software testing, hardware testing, and others.

Description of the Related Art

Group testing concerns determining a small set of defective items from a larger set of items using as few tests as possible. Group testing can be used for various applications including software testing, chemical and electrical testing, medical testing, cyber security, detecting defecting items during manufacturing, and so on. Group testing has been used for accelerating deep learning techniques, for example, for improving the performance of a forward pass of neural networks that are highly computation intensive. Examples of such neural network techniques that may be accelerated using group testing include deep learning based image processing, malware detection, and so on.

Existing techniques of group testing themselves can be highly computation intensive. For example, group testing may be performed by collecting samples from a population and running tests on the set of samples collected. Running test on each sample can be resource intensive operation and also computationally slow. Furthermore, the techniques may not scale, for example, the techniques may not be tractable if a very large population is being tested.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure 1:
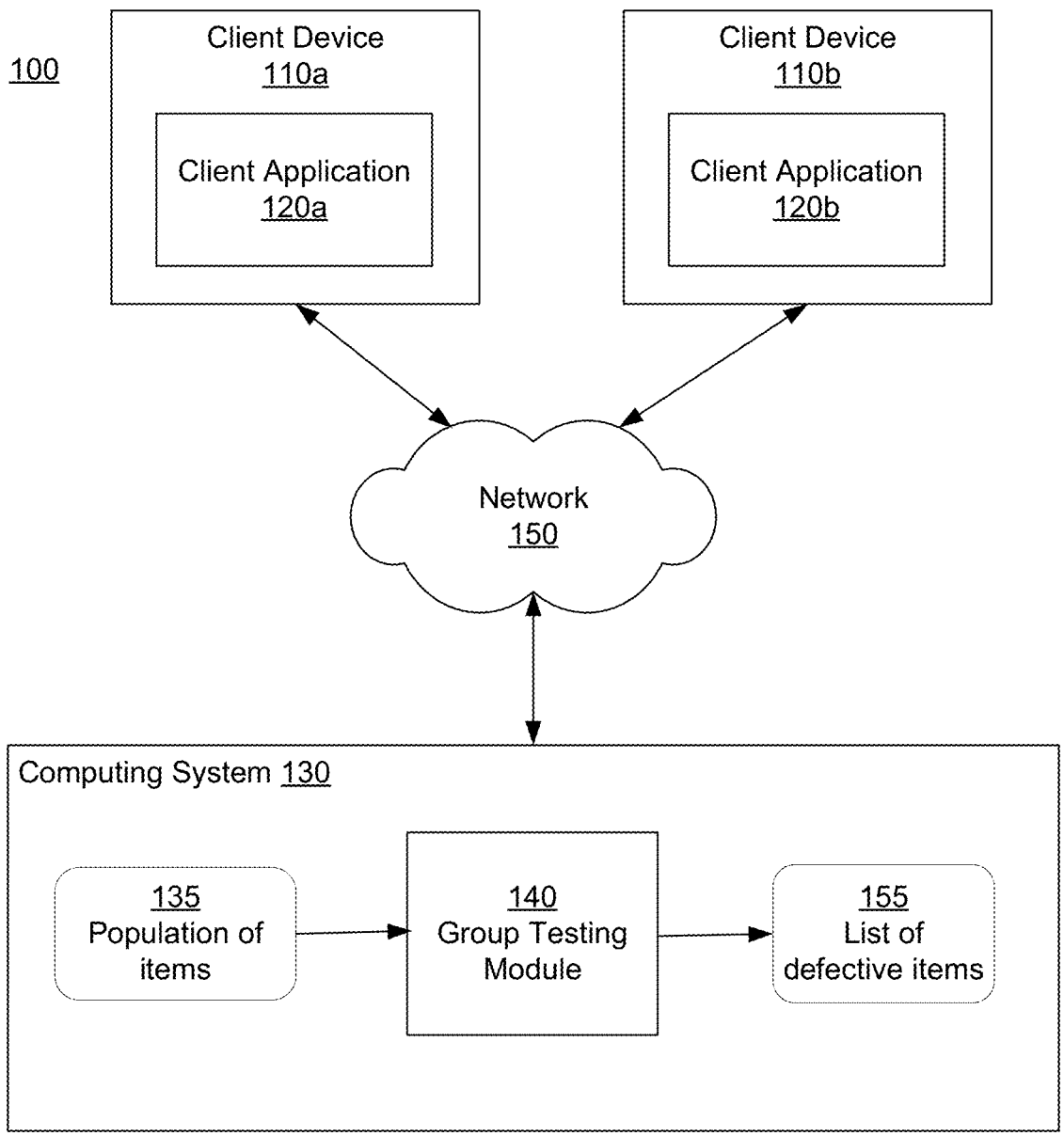
FIG. 1 is a block diagram of a system environment including a computing system for performing group testing, in accordance with an embodiment.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

DETAILED DESCRIPTION

Embodiments perform group testing by determining a set of defective items from a larger set of items using as few tests as possible. Group testing is a process that breaks up the task of identifying certain objects, for example, defective items into tests on groups of items, rather than on individual ones. According to an embodiment, the system eliminates groups of samples that test negative and adaptively retests, groups of samples that test positive. There can be various schemes for carrying out group testing. Schemes in which the tests for the next stage depend on the results of the previous stages are called adaptive procedures. Schemes designed so that all the tests are known beforehand are called non-adaptive procedures.

Group testing may be used for various application, for example, for software testing, testing of sensors, testing of devices such as servers in a large configuration such as a server farm, testing of diseases in human population (for example, testing for COVID-19), and so on. The techniques disclosed apply to several applications including rule-based classification in machine learning, medium access control in communication systems, quality control in manufacturing, and so on.

Another use of the techniques disclosed herein is to apply group testing for accelerating deep learning. Deep learning networks, for example, neural networks can be highly computation intensive. System use group testing to test a group of samples in a forward pass of the neural network.

Since physical tests may be noisy, redundancy is added to achieve reliable results (the Shannon limit for communication is also a fundamental limit on the number of required tests). Embodiments include a formulation of group testing that considers noise in physical tests, along with (1) potentially complicated correlation structure among the defective states of items, and (2) side information on their defective status including network structure. The system uses a deep learning architecture to implement adaptive pooling protocols. According to an embodiment, the system uses reinforcement learning method to implement adaptive pooling protocols. The system also adapts the adaptive group testing to non-adaptive group testing.

The system according to an embodiment, incorporates above stated and other factors that influence the efficiency and accuracy of group testing as side information. Side information represents any information describing the group test that characterizes the behavior of the group test. The system implements a generic framework to incorporate any such side information as input to a learnt model for group testing.

Experiments show significant reduction in number of tests compared to baselines that do not consider correlation structure or side information. Comparison to newly derived information-theoretic limits show the learned schemes are nearly optimal. Accordingly, system improves the efficiency of use of resources by reducing the number of tests that are performed to identify the defective samples.

Overall System Environment

FIG. 1 is a block diagram of a system environment including a computing system for performing group testing, in accordance with an embodiment. The system environment 100 shown in FIG. 1 comprises a computing system 130, client devices 110A, 110B, and a network 120. In alternative configurations, different and/or additional components may be included in the system environment 100. The computing system 130 may be an online system but may also work offline, for example, by performing batch processing for performing scene text recognition.

The computing system 130 includes a group testing module 140. The computing system 130 receives information describing a population 135 of items provided as input for the group testing. The population 135 of items may represent devices that are being tested for identifying defective devices. The items of the population 135 may represent tests that are being performed on a software for identifying tests that fail. The group testing module 140 performs group testing on the population 135 of items to determine a list 155 of defective items. In an embodiment, the group testing is used for software/hardware testing, the items represent software/hardware tests and the defective items represent software/hardware tests that fail. In an embodiment, the group testing is used for testing sensors and the defective item represents a sensor that has a particular type of signal, for example, signal value that exceeds a threshold value. The group testing module 140 models the problem of pooling strategy for group testing as a reinforcement learning problem. Even though FIG. 1 shows the output of the group testing nodule 140 as a list 155 of defective items, the group testing nodule 140 may be used to identify items from the population 135 that satisfy any particular criteria, for example, sensors that generate a particular value of signals, users that pass certain tests, and so on.

Existing techniques for group testing assume that the tests are perfect. In contrast, the embodiments characterize efficacy of the test by its sensitivity and specificity. Sensitivity represents a measure of proportion of positive samples that are correctly identified. Sensitivity may be determined as the ratio of number of true positives (TP) and the sum of number of true positives (TP) and number of false negatives (FN), i.e., sensitivity=TP/(TP+FN). Specificity represents measure of proportion of negative samples that are correctly identified. Specificity may be determined as a ratio of a number of true negatives (TN) and the sum of number of true negatives (TN) and the number of false positives (FP), i.e., specificity=TN/(TN+FP). Sensitivity and specificity are also functions of group size as tests are sensitive to dilution. Test efficacy is also influenced by other factors such as prior P(Y) on defective items. The prior might in turn be influenced by spatial structure or in general some form of connected structure, for example, a structure based on graph connectivity.

The system receives the sensitivity and specificity of a test as input and incorporates the information while performing the group testing. Such parameters describing the test are referred to as side information. The system according to various embodiments receives side information describing the tests as input and uses the side information to perform accurate group testing. Another examples of side information processed by the system is prior defective rate. Test efficacy is influenced by factors such as prior P(Y) on defective items. The prior might in turn be influenced by spatial and in general some form of connected structure.

Figure 2:
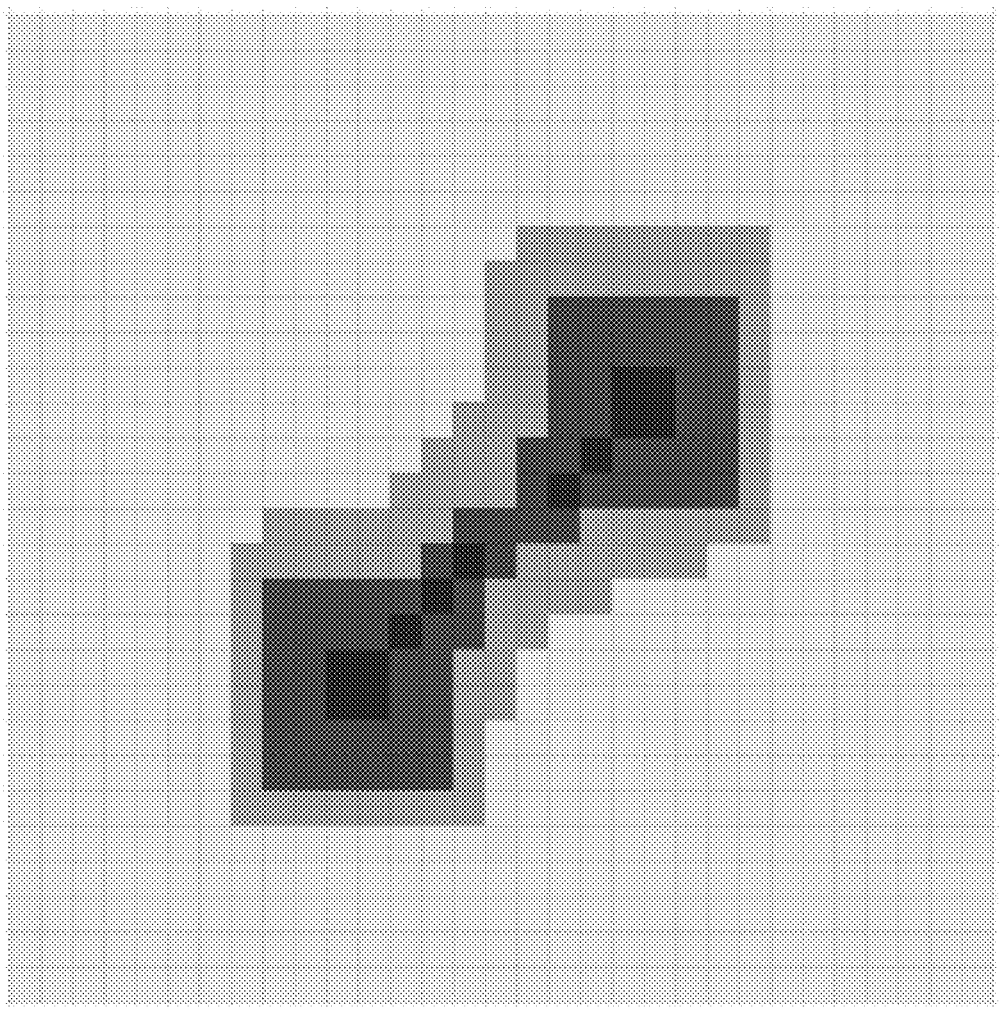
FIG. 2 shows an example of influence of spatial or connected structural information on the test result.

FIG. 2 shows an example of influence of spatial or connected structural information on the test result. For example, if an item is found defective, there is high probability that other items that are related to the defective item are also defective. The relation between the items may be spatial, for example, having some sort of proximity, for example, items produced in the same batch, items produced by the same facility, test cases belonging to the same suite, and so on. The structural relation may be based on a graph relation, for example, a social graph such that items that are close to as defective item by traversing the graph are likely to be more defective. For example, if a person is determined to be infected by a particular disease (that is infectious), other persons related to that person, such as family members or friends are more likely to get infected by the disease. Such persons may be related to that person vis a relationship graph such as a social graph. Alternatively, the graph may represent a computer network and if a node representing a server has a security issue (such as a computer virus), other nodes that are within a threshold neighborhood of the server in the network graph have a higher likelihood of developing the security issue as well. FIG. 2 illustrates a spatial structure, where each block represents geographical location and two neighboring blocks in the graph are neighboring in physical world. Alternatively, the blocks may represent portions of a silicon wafer from which chips are extracted. A faulty location on the wafer may result in all neighboring chips obtained from the wafer to be defective. The system can receive such side information representing structural relation between items and adjust the group testing to incorporate the side information. The system may receive side information representing prior probability related to the population, for example, defective rate of the population and incorporate it in the group testing. Another type of side information that the system can consider represents properties of the test such as dilution caused by large number of samples. Some side information may be test specific.

The system uses quantitative learning, i.e., the system receives data related to group testing and learns from the data. The system generates data for group testing using a simulator that incorporates the different type of side information and behaves similar to the group test. According to an embodiment, the system uses a reinforcement learning based agent. According to an embodiment, the system uses a simulator to try out different scenarios associated with the group testing for a specific application. The system learns the optimal policy by utilizing the simulator. The various types of side information is incorporated in the simulator. The simulator may take various configuration parameters that represent inputs. The system can adjust the configuration parameters and the system behaves similar to the group test scenario. The use of the simulator allows the system to train the reinforcement learning based agent without having to perform expensive tests. The reinforcement learning based agent may use rewards that weigh different types of defective items differently. Accordingly, the reward of the system depends on the type of defective item encountered. For example, certain software defects determined by software testing may be much higher priority and need to be fixed as soon as possible whereas other software defects may be lower priority. The reward of the reinforcement learning based agent is determined by the type of defect.

The client devices 110 are used to provide input to the group testing module 140 as well as to review the output of the group testing module 140. The client devices 110 may also be used to configure the group testing module 140. Here only two client devices 110a, 110b are illustrated but there may be multiple instances of each of these entities. For example, there may be several computing systems 130 and dozens or hundreds of client devices 110 in communication with each computing system 130. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral.

The client devices 110 are computing devices such as smartphones with an operating system such as ANDROID® or APPLE® IOS®, tablet computers, laptop computers, desktop computers, electronic stereos in automobiles or other vehicles, or any other type of network-enabled device on which digital content may be listened to or otherwise experienced. Typical client devices 110 include the hardware and software needed to connect to the network 150 (e.g., via Wifi and/or 4G or other wireless telecommunication standards).

The client device 110 includes a client application 120 that allows a user of the client device 110 to interact with the computing system 130. For example, the client application 120 may be a user interface that allows users to capture a scene image that is sent to the computing system 130. The client application 120 may receive the text extracted from the scene image determined by the computing system 130 and process it further. In an embodiment, the client application 120 is a browser that allows users of client devices 110 to interact with a web server executing on the computing system 130.

The network 150 provides a communication infrastructure between the client devices 110 and the record management system 130. The network 150 is typically the Internet, but may be any network, including but not limited to a Local Area Network (LAN), a Metropolitan Area Network (MAN), a Wide Area Network (WAN), a mobile wired or wireless network, a private network, or a virtual private network. Portions of the network 150 may be provided by links using communications technologies including WiFi based on the IEEE 802.11 standard, the BLUETOOTH short range standard, and the Wireless Universal Serial Bus (USB) standard.

System Architecture

Figure 3:
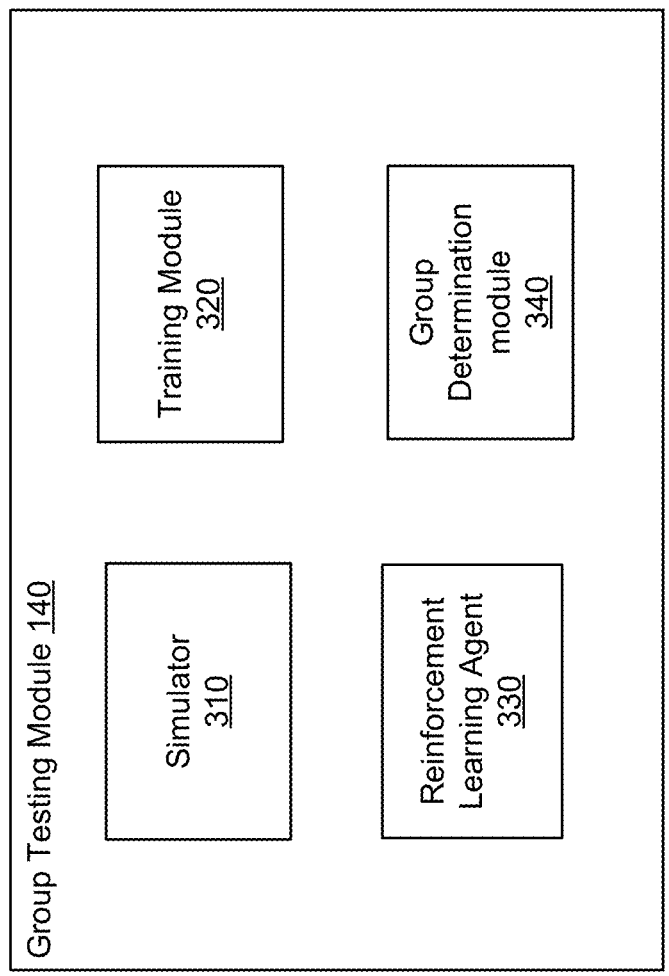
FIG. 3 illustrates the system architecture of the group testing module, in accordance with an embodiment.

FIG. 3 illustrates the system architecture of the group testing module, in accordance with an embodiment. The group testing module 140 includes a simulator 310, a training module 320, a reinforcement learning agent 330, and a group determination module 340. Other embodiments may include more of fewer components than those indicated in FIG. 3. Conventional components such as network interfaces, security functions, load balancers, failover servers, management and network operation consoles, and the like are not shown so as to not obscure the details of the system architecture.

The reinforcement learning agent 330 is a component that receives information describing the environment and determines an action to be taken in response to the information. The environment may represent the population of the items and current group configuration as well as the currently determined defective items. The action may represent modifications to the current grouping of the items for performing the group testing. In an embodiment, the reinforcement learning process is modeled as a Markov Decision Process (MDP) that comprises a set of environment and agent states, a set of actions and a probability of transition from one state s1 to another state s2 under a particular action a, and a reward after transition from state s2 under the action a. The reinforcement learning agent learns an optimal, or nearly-optimal, policy that maximizes the 'reward function' or other user-provided reinforcement signal that accumulates from the immediate rewards. For example, the reinforcement learning agent 330 learns a group testing policy that maximizes a reward function based on the current group configuration and currently known defective items.

According to an embodiment, the reinforcement learning agent 330 interacts with the environment in discrete time steps. At each time t, the agent receives the current state and reward and chooses an action a from the set of available actions. The action a subsequently affects the environment. The environment moves to a new state and the reward associated with the new state is determined. The reinforcement learning agent 330 is to learn a group testing policy that maximizes the expected cumulative reward. The reinforcement learning agent 330 may be trained using the simulator to generate a group testing policy.

The simulator 310 performs a simulation of the population of items. Accordingly, performing group testing on the simulator has characteristics similar to performing group testing on a population of items. These include characteristics that define side information as described herein. The simulator receives configuration parameters that allow the system to adjust the group testing characteristics of the population. This allows simulating different types of populations and different types of group testing behavior. The simulator is used by the training module 320 to train the reinforcement learning agent 330. Testing on a real population may be computationally intensive i.e., expensive in terms of cost of computational resources. The use of the simulator 310 allows the reinforcement learning agent 330 can be trained without incurring the cost of actual testing. The group determination module 340 initializes a group configuration for performing group testing and then modifies the group configuration, for example, based on input from the reinforcement learning agent 330 to perform the group testing.

Figure 4:
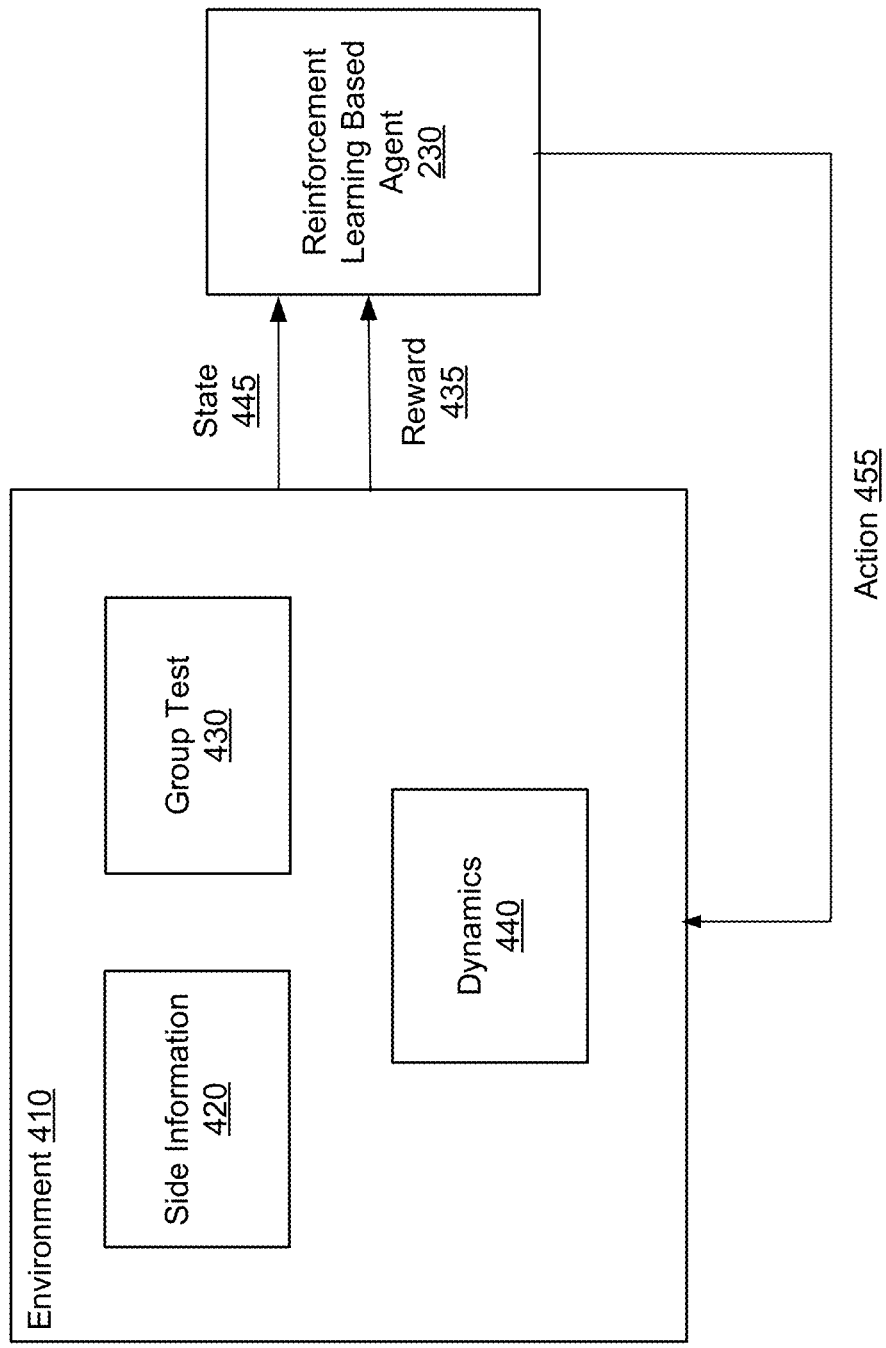
FIG. 4 illustrates a configuration of the system for performing group testing, in accordance with an embodiment.

FIG. 4 illustrates a configuration of the system for performing group testing, in accordance with an embodiment. The configuration shown in FIG. 4 represents group testing using an adaptive pooling strategy, however the techniques disclosed herein can be applied to group testing using non-adaptive pooling strategies. An adaptive group testing strategy generates a group configuration and performs testing using the group configuration. The system waits for the result of group testing and then based on the result of the group testing adjusts the group configuration.

The system shown in FIG. 4 can be used for training the reinforcement learning based agent 330. Assume that the environment 410 is in a state s1. The reinforcement learning based agent 330 observes the state 445 of the environment Based on the observed state 445, the reinforcement learning based agent 330 performs an action 455. Based on the action, the state of the environment changes to another state s2. The reinforcement learning based agent 330 may determine a reward 435 as a result of the state transition from state s1 to state s2.

The system further learns characteristics of the environment as well. These include the dynamics 440 of the system. The system performs multiple group testing episodes. Each episode comprises a sequence of tests implementing a group testing scenario. Different group testing scenarios may be tried for different parameters of the system configuration, for example, different values of sensitivity or specificity. These parameters represent different side information 420 of the environment 410. The group test behavior depends on the side information 420. For example, if the system configuration is set to a particular value of sensitivity and specificity, the group test 430 mimics a behavior of a population of items according to the configuration set by the side information 420. This allows the system to train the agent using simulated behavior rather than actual tests of a real population of items.

The reinforcement learning based agent 230 learns how to configure the groups, for example, which item should go to which group, the number of groups used, sizes of various groups, and so on. Accordingly, the reinforcement learning based agent 330 learns the pooling strategy to be used for group testing.

The system further learns the dynamics of the environment representing the information describing the items of the population that changes over time as the group testing proceeds. For example, initially, the system associates items with a prior probability that a selected item is defective. As the tests are run, the probability of items changes. The system tracks the probability of items being defective as the group testing proceeds. For example, if a particular item if determined to be defective, the probability of other items related to the defective item may change. The relation of these other items may be determined based on geographical proximity to the defective item, or based on a relationship to the defective item determined based on a relationships graph. In an embodiment, the prior probability of different items may be determined based on the groups that they belong to. For example, if a defective item is identified in a group, the prior probabilities of the remaining items of the group may change.

The system performs testing and adjusts the prior probabilities of each item as a result of the test. Before performing testing, an item may have a prior probability of being defective to be P1. After performing testing, the prior probability of the item being defective may change to P2. The probability value may be adjusted based on the side information such as specificity and sensitivity of the test, structural information, group dilution, and so on. The system tracks the changes in the prior probabilities of different items as the group testing proceeds. The prior probability of an item represents the likelihood of that item being defective. Accordingly, the system to learn the dynamics 440 of the population, for example, as shown in FIG. 2.

Quantitative Learning Based Group Testing

Figure 5:
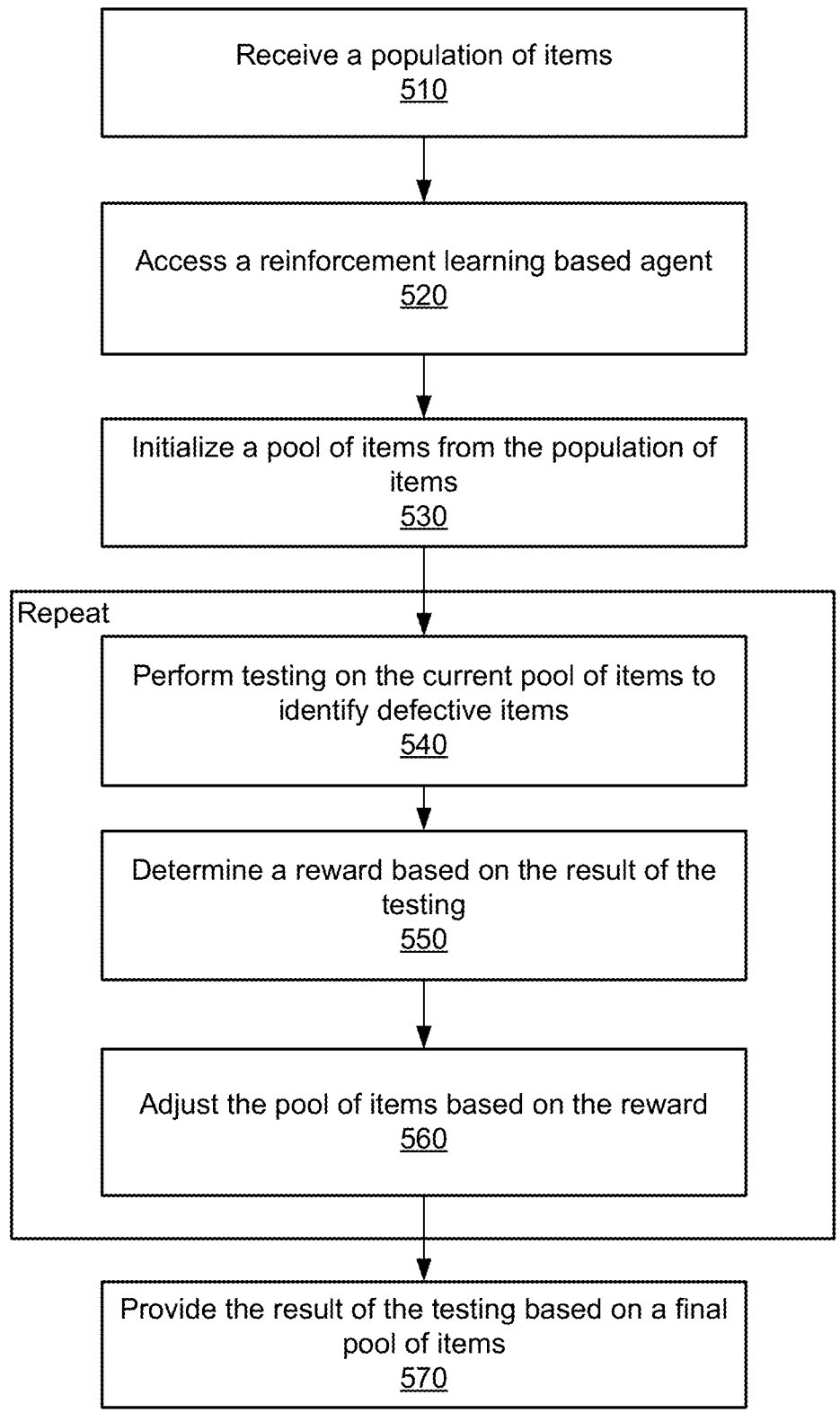
FIG. 5 illustrates the process of performing group testing using a reinforcement learning based agent, according to an embodiment.

FIG. 5 illustrates the process of performing group testing using a reinforcement learning based agent, according to an embodiment. The steps described herein may be performed in an order different from that indicated herein.

The system receives 510 a population of items including a subset of defective items. A defective item is an item that satisfies certain predefined criteria based on properties of the item. The predefined criteria differentiate the defective item compared to other items determined to be not defective. A defective item does not have to be faulty in terms of performing sub-optimally compared to other items.

The system receives a request to perform group testing on the population of items to identify defective items in the population. The system accesses 520 a reinforcement learning based agent. According to an embodiment, the reinforcement learning based agent is a neural network and accessing the reinforcement learning based agent comprises accessing the parameters of the neural network. The system initializes 530 a pool of items representing a set of groups of items from the population of items.

The system performs group testing of the population of items using reinforcement learning by performing the following steps 540, 550, 560 repeatedly. The system performs 540 testing on the current pool of items to identify defective items. The system determines 550 a reward based on the results of the testing. In an embodiment, the reward is determined based on the type of defective item. For example, certain types of defective items are considered more significant than other defective items and accordingly are associated with higher reward than the other defective items. For example, certain tests represent critical defects in the software being tested and are associated with higher rewards. Accordingly, the reinforcement learning based agent is configured to give higher priority to defective items having higher rewards. The reinforcement learning based agent adjusts 560 the pool of items based on the reward, for example, by adding/removing items from existing groups or by creating new groups.

The system further learns dynamics of the environment representing the prior probability of various items and changes to the prior probabilities as the tests are performed by the system. A prior probability of an item represents the likelihood of the item being a defective item.

The system transmits the result of testing based on a final pool of items. The result identifies one or more defective items from the population of items. The results may be sent to a client device for display, for example, via a user interface toa data analyst.

According to an embodiment, the system trains the reinforcement learning based agent using a simulator that represents the group testing. Accordingly, the simulator is configured to incorporate configuration parameters representing side information associated with the population of items. The simulator receives one or more configuration parameters and behaves similar to performing the group test on a population of items responsive to changes in the input parameters. For example, the side information may represent correlation between defective items in the population of items. The side information may represent structural information representing distribution of the defective items, for example, distribution of prior on defective items in the population of items. The side information may represent sensitivity or specificity of the group test performed on the population of the items. The side information may represent a dilution factor that determines the effect on the group test of dilution caused by increasing the population size. The agent is trained using the simulator and when used against a real population of items, the agent adapts to the real life situation represented by the population of items.

Dynamics Learning of the Environment

Dynamics of pooling protocol tracks the (posterior) probability that an item is defective, based on the evidence gathered by result of group testing conducted till that point (timestep t).

During training phase, the defective items (i.e., true label Y) are known apriori. We frame dynamics learning as minimizing binary cross entropy loss between the true label and the posterior of item to be defective $P(Y|G_{\leq t})$.

Binary cross entropy is represented by the following equation.

$$L = E_{Y \sim P(Y), t \in [0,T], i \in [0,N]} [-Y_i \log P(Y_i|G_{\leq t}) - (1-Y_i) \log (1 - P(Y_i|G_{\leq t}))] \quad (1)$$

In this equation, Y is the ground truth; N is the number of items in the cohort; $P(Y_i)$ is the prior (without evidence) of item, i to be defective; $P(Y_i|G_{\leq t})$ is the probability of item, i to be defective based on candidate & results of group testing $G_{\leq t}$ conducted till time step t. $G_{\leq t}$ is stored in memory in the form of recurrent units such as LSTM, attention based network, transformers and so on. $P(Y_i)$ represents the distribution of defective items in the population. The distribution is provided as input to a simulator. There may be t rounds of test. The different rounds of tests may run in parallel.

Using the binary cross entropy loss (1) as such, a system may run into following issues: (1) The posterior $P(Y|G_{\leq t})$ might end up being independent of the results of group tests. (2) The posterior $P(Y|G_{\leq t})$ might end up overfitting to spurious noise. (3) The posterior $P(Y|G_{\leq t})$ might be subjected to class imbalance and favor the majority class. Especially since gains in efficacy of group testing is high when the rate of the defect is low i.e prior or probability of defect is very low $P(Y) \ll 1$ The system addresses the above shortcomings with the following remedies: (1) According to an embodiment, the learning agent uses a neural network and all layers of the neural network that is used to model $P(Y|G_{\leq t})$ are restricted not to have bias parameters. A bias parameter quantifies how strongly a particular class of items is clustered relative to mass density perturbations. For example, a logistic regression model may be represented as $$P = \frac{e^{a+bX}}{1+e^{a+bX}}$$

where P represents a probability of an item being defective, e is the base of the natural logarithm (about 2.718) and a and b are the parameters of the model, where a is the bias parameter and b is a weight. According to an embodiment, the system sets the bias parameter a to zero for various layers of the neural network. Disabling the bias parameter prevents the neural network from learning information that is not based on the input. (2) According to an embodiment, the labels are reweighted by their inverse propensity weight. Accordingly, events that have lower probability of occurrence are weighted higher than frequently occurring events. (3) According to an embodiment, for every item, i in the cohort, the system maintains a tree $\mathcal{T}_i$ of the items that were part of the same test pool, $\mathcal{P}_t$ or linked though intermediate items sharing the same test pool.

With these changes the loss (1) is represented as (2).

$$L = E_{Y\sim P(Y), t\in[0,T], i\in[0,G]}\left[-\frac{\hat{Y}_i}{P(Y)}\log P(Y_i|G_{\leq t}) - \frac{(1-\hat{Y}_i)}{(1-P(Y))}\log(P(Y_i|G_{\leq t}))\right] \quad (2)$$

In the above equation (2), $$\hat{Y}_i = \begin{cases} Y_i, & \text{If } j \in \mathcal{T}_i; j \in \mathcal{P}_t \\ P(Y_i|G_{\leq t-1}), & \text{If } j \notin \mathcal{T}_i; j \in \mathcal{P}_t \end{cases}$$

Accordingly, a label for an item is used only if a descendent of the item is part of the current pool test. If there is no descendent of the item that is part of the pool, the system uses the probability $P(Y_i|G_{\leq t-1})$ of the item prediction in the previous time stamp. The descendent of the item is determined based on the tree $\mathcal{T}_i$ representation. This forces the results to be dependent on the test. The labels of an item are not used if none of the items in the pool are descendants of the item. Accordingly, if an item is an ancestor of an item in the pool, the outcome of the item is changed by the system.

Policy Learning

The state of policy, s could include posterior probability $P(Y_i|G_{\leq t-1})$ of each item to be defective, history of previous action, history of previous states, aggregated group level information, history of aggregate group level information. The histories are captured by using deep learning primitives such as LSTM, transformers and so on.

The action space of the reinforcement agent in this environment (MDP), are the various combinations selecting items from the cohort of candidates for pooling. The joint probability of selecting a combination of items a is given by following equation.

$$\pi(a|s;\theta) = \Pi_i^N q_i^{a_i}(1-q_i)^{(1-a_i)} \quad (3)$$

In equation (3), $q_i$ is the probability of selecting item i to be part of a pool test, and $a_i$ is the actual selection (if $a_i=1$, item i is selected to be part of the pool and not selected otherwise). $a_i$ is obtained by (posterior-) sampling the probability distribution $q_i$ i.e., $a_i \sim q_i$. $\pi$ represents the policy for pooling that is learnt by the system.

The reward for the agent is represented using following equation.

$$R_t = I(Y, Y|G_{\leq t}) - I(Y, Y|G_{\leq t-1}) \quad (4)$$

The reward is determined based on information gain about the labels between timesteps. In equation (4) I represents mutual information. Y represents the true label. $Y|G_{\leq t}$ represents the belief of Y after performing T rounds of test. The reward is measured based on the gain in information represented by the difference of information between $I(Y, Y|G_{\leq t})$ at time step t and $I(Y, Y|G_{\leq t-1})$ at time step t−1.

The policy is optimized by using learning policy gradient.

$$\nabla_\theta J = E[\Sigma_{t=0}^T A_t \nabla_\theta \log \pi(a|s;\theta)] \quad (5)$$

Here, advantage $A_t = A(a_t, s_t) = G(a_t, s_t) - B_t$. The system uses returns at timestep t, determined using following equation.

$$G_t = G(a_t, s_t) = \Sigma_{t=t'}^T \gamma^{t-t'} R(a_t, s_t) \quad (6)$$

Where γ is the discount factor that has a value between 0 and 1. $B_t$ is a baseline that represents a lower bound. In some embodiments, the theoretical Shannon lower bound is selected as the baseline. Accordingly, the system prevents having a strategy that is better than the lower bound that is represented by the baseline.

Curriculum Learning

The system according to an embodiment performs curriculum learning for group testing. The action space representing the actions that can be performed for such a policy can be exponential large, $2^N$ to be precise, where N is the number of items in the cohort. This creates the problem for effective exploration of the state-actions space and the agent learning optimal policy. To address this problem, the system according to an embodiment uses curriculum learning as following.

$$v_{e+1} = \underset{V}{\text{argmax}} E_{a_t \sim \pi, s_t - T_{P(c;v)}} [A(a_0, s_0)] \nabla_v \log p_{v(c)} - \alpha D_{KL}(p_v(c) \| \mu(c)) \quad (7)$$

$$\text{s.t. } D_{KL}(p(c;v) \| p(c;v_e))$$

The system slowly increases the complexity of the problem for effective learning. µ(c) represent the desired distribution of group testing context for which the system determines the learnt policy to solve optimally. The system uses KL (Kullback-Leibler) divergence between the two distributions, i.e., the distribution representing the current expertise level and the distribution representing the desired expertise level. The context, c: corresponds to prior of defective items and desired side information such specificity & sensitivity of the test, cohort size, spatial information etc.

p(c; v) represents the distribution of group testing context for which the current policy $\pi(a|s; \theta)$ performs best. $T_{p(c;v)}$ is the transition probability corresponding to p(c; v) which is a function of the $P(Y|G_{\leq t})$ and test results. The divergence $D_{KL}(p_v(c)\|\mu(c))$ ensure the $p_v(c)$ converges to desired $\mu(c)$. The constraint $D_{KL}(p(c; v)\|p(c; v_e))$ ensures the group testing context is not too divergent between episodes.

The system updates $v_{e+1}$ for each new episode. The episode is represented as e in (5). The training procedure involves alternating between optimizing for (2), (5) and (7) fixing parameters of other 2 optimization.

If one of the side information has spatial or connected structure of the items, the system according to an embodiment uses deep learning primitives such as CNN (convolutional neural networks) or GNN (graph neural network) to help learn representation of each item which will form part of the item state.

Non-Adaptive Group Testing

In a non-adaptive group testing strategy, the system performs several tests in parallel and gets the results of the tests and uses the result to determine the defective items. Unlike adaptive testing, the system does not wait for results of a test before performing the next set of tests. As a result, non-adaptive testing can achieve results faster. For example, if a test requires several days to provide the results, uses an adaptive strategy that requires the system to wait for a set of results before performing the nest set of results can take prohibitively long time.

Figure 6:
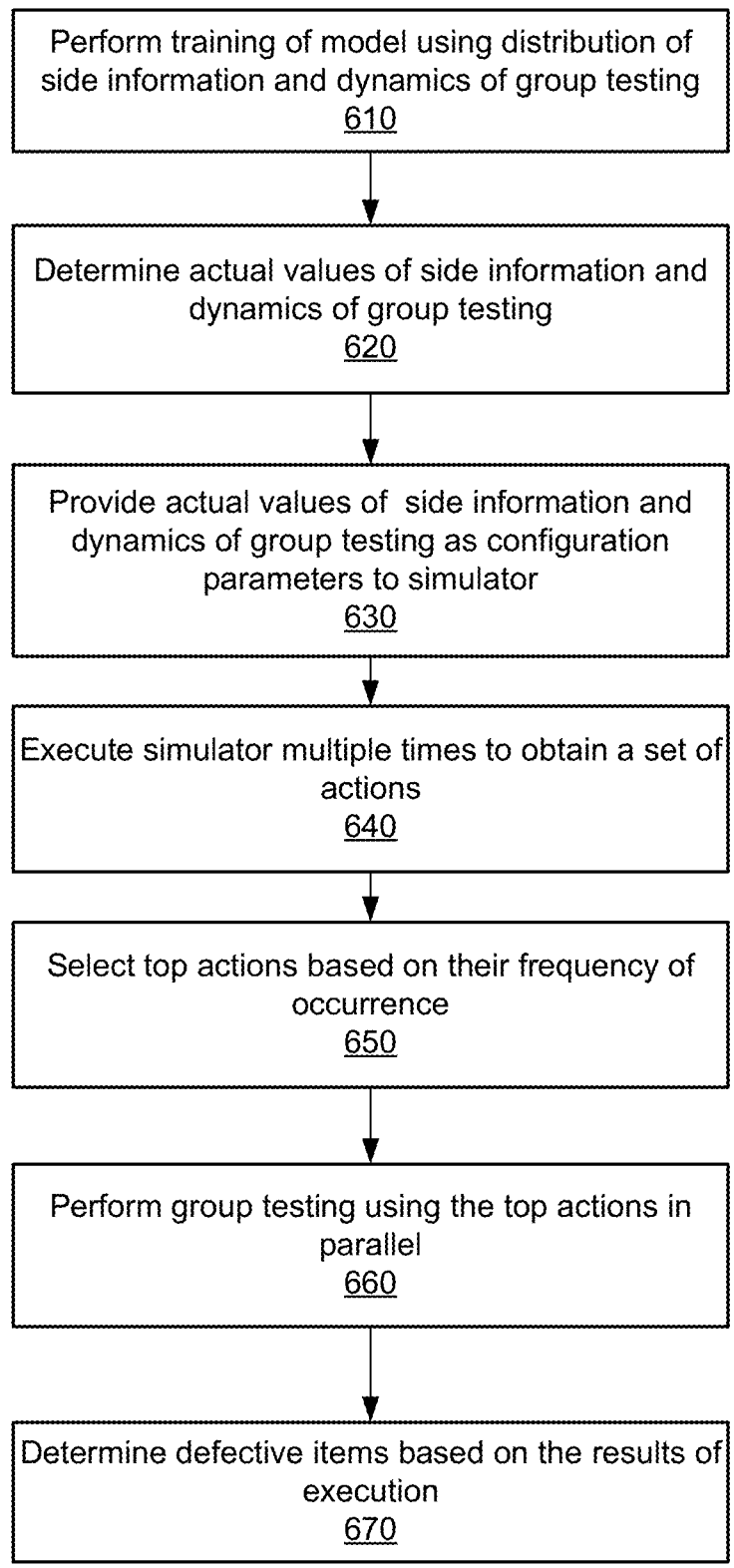
FIG. 6 shows a flowchart illustrating a non-adaptive strategy for performing group testing according to an embodiment.

FIG. 6 shows a flowchart illustrating a non-adaptive strategy for performing group testing according to an embodiment. The steps described herein may be performed in an order different from that indicated herein.

The system performs 610 training of a model using a simulator. The system uses distributions of side information during training. The model may be a reinforcement based learning model or any other machine learning based model. The model is configured to evaluate groupings for testing of a population of items.

The system determines 620 actual values of side information as well as dynamics of the environment by performing group testing using an actual population of items. The system provides 630 the actual side information to the simulator as configuration parameters. Accordingly, the simulator is executed with fixed values of side information and dynamics rather than distributions.

The system executes 640 the simulator to perform group testing simulations multiple times using the trained model. The simulated group testing may be performed, for example, several thousand times since simulation can run faster than actual testing. The system performs monte carlo simulation based on the multiple runs. Based on the monte carlo simulation, the system selects 650 top actions representing the most common actions that were performed. An action may be represented as a binary array wherein the $i^{th}$ element is 1 if the $i_{th}$ item is part of the test and the $i^{th}$ element is 0 if the $i^{th}$ item is not part of the test. For example, action a=[1, 1, 0, 0, 0] indicates that items 1 and 2 are part of the test whereas items 3, 4, and 5 are not part of the test. Similarly, action a=[0, 1, 0, 1, 1] indicates that items 2, 4, and 5 are part of the test whereas items 1 and 3 are not part of the test. The system selects the top few actions and performs group invariance to combine actions that are equivalent.

The system performs 660 group testing on the population of items using the top actions. The group testing may be performed in parallel since the system does not need to wait for one set of tests to complete before performing the next set of tests. The system determines 670 the defective items based on the results of executions of the group testing performed 660.

The saving from group testing is defined by Shanon's information lower bound, as follows, where p is the prior of an item (and q=1−p) being defective. N—is the # of items in the cohort.

$$H(p) = N\left[p\log_2\frac{1}{p} + q\log_2\frac{1}{q}\right]$$

H(p) represents the information theoretical lower bound for the expected number of tests under an optimal procedure and is the Shannon formula of entropy. Below are some of the lower bounds on the number of tests needed for different priors of an item being defective (for N=100). The savings according to various embodiment is more than those indicated in the following table.

| p | H(p) |
| --- | --- |
| 0.001 | 1.141 |
| 0.005 | 4.541 |
| 0.01 | 8.079 |
| 0.03 | 19.439 |
| 0.05 | 28.640 |
| 0.07 | 36.592 |
| 0.10 | 46.900 |
| 0.13 | 55.744 |
| 0.15 | 60.984 |
| 0.20 | 72.192 |
| 0.25 | 81.128 |
| 0.27 | 84.146 |
| 0.30 | 88.129 |
| 0.32 | 90.438 |
| 0.35 | 93.407 |
| 0.38 | 95.804 |

Given the distribution of context parameter $\mu(c)$ such as prior on defect; specificity & sensitivity of the test etc., representing items in the cohort and the group test efficacy, the system simulates ground truth of defective items and the outcome of a group test. The system leverages this fact and sample context $c\sim\mu(c)$ and true label $Y\sim P(Y)$. The system performs Monte carlo simulation on the sampled values (c & y) and simulates group test results. The system maintains the frequency of each combination of actions encountered while performing monte carlo sampling rollouts (see Table I below). Table I shows examples of combination of actions and their corresponding frequencies of occurrence encountered while monte-carlo sampling for a given context parameter $\mu(c)$ and item defective prior P(Y).

TABLE I

| a | Frequency |
| --- | --- |
| [1, 1, 0, 0, 0] | 20 |
| [0, 1, 0, 1, 1] | 18 |
| ... | ... |
| [1, 0, 0, 0, 0] | 1 |

Figures 7A, 7B:
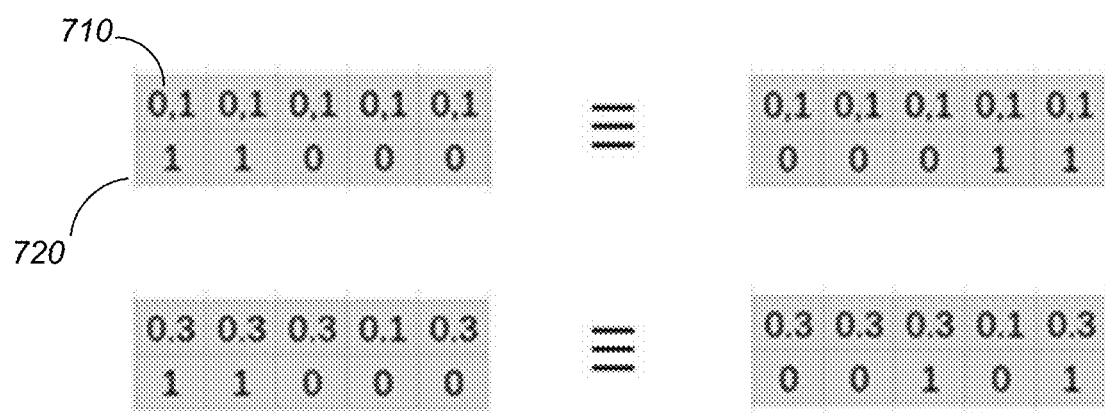
FIGS. 7A and 7B shows examples of group invariant permutation of candidate selection, according to an embodiment.

The system treats group invariant permutations of candidate selection as the same, as illustrated in FIG. 7. FIG. 7 shows an action 720 representing the membership of items in the tests and priors 710 of the items. The item defective priors change over time as tests are performed and the system tracks the changes. Two permutations of candidate selections are considered equivalent if the values of the candidate items that are present in the set have matching priors. As shown in FIG. 7, example poolings in FIG. 7A are equivalent to corresponding poolings in FIG. 7B. The system considers group invariance while counting the occurrences of the various action combinations.

Based on frequency of occurrence, the system picks top-K action combinations. Here K is a hyper-parameter. The system enumerates each of these action combinations. The system treats combination of the enumeration as new action space and treats them as non-adaptive actions $\Lambda \in [0,1]^K$, this illustrated in Tables II and III. Table I shows examples of Top-K action combination from the monte-carlo simulation and their corresponding non-adaptive action space. Table III shows examples of combinations of non-adaptive action space and their corresponding set of action combination in adaptable pooling from the monte-carlo simulation.

TABLE II

| Non-adaptive action space $\Lambda \in [0, 1]^K$ | | Top-K action combinationafrom the monte carlo simulation |
|---|---|---|
| [1, 0, . . . , 0, 0] | ⇆ | {[1, 1, 0, 0, 0]} |
| [0, 1, . . . , 0, 0] | ⇆ | {[0, 1, 0, 1, 1]} |
| . . . | ⇆ | . . . |
| [0, 0, . . . , 0, 1] | ⇆ | {[1, 0, 0, 0, 0]} |

TABLE III

| Non-adaptive action space $\Lambda \in [0, 1]^K$ | | Adaptable action combinationafrom the monte carlo simulation |
|---|---|---|
| [1, 1, . . . , 0, 0] | ⇆ | {[1, 1, 0, 0, 0], [0, 1, 0, 1, 1]} |
| [0, 1, . . . , 0, 1] | ⇆ | {[0, 1, 0, 1, 1], [1, 0, 0, 0, 0]} |
| [1, 0, . . . , 0, 1] | ⇆ | {[1, 1, 0, 0, 0]], [1, 0, 0, 0, 0]} |

The system performs learning based on the selection actions. The system selects combinations that have high returns. Then the corresponding non-adaptive policy is given by following equation (8).

$$\pi_n(\Lambda;\varphi) = \Pi_k^K u_k^{\Lambda_k}(1-u_k)^{(1-\Lambda_k)} \quad (8)$$

Where the return G is given by $$G = \max_{a_t \in \Lambda_T} \sum_{t=0}^{T} \gamma^t R(a_t, s_t | s_t \sim T(c)) \quad (9)$$

$u_k$ is the posterior (probability) of selecting non-adaptive action indexed by k. We pick top-Taction based on posterior u, we represent this combination of top-T of non-adaptive actions as $\Lambda_T$. The non-adaptive bandit policy is optimized by the following policy gradient.

$$\nabla_\varphi J = E_{c \sim \mu(c), Y \sim P(Y)}[G \nabla_\theta \log \pi_n(\Lambda_T;\varphi)] \quad (10)$$

The system uses curriculum learning described in equation (1) for effective exploration of the combinatorial action space. The non-adaptive policy $\pi_n(\Lambda_T; \varphi)$ is independent of the input (/state) hence it is modeled as a bandit problem.

Once learnt, the combinatorial action set $\Lambda_T$ forms the candidate groupings for non-adaptive group testing.

Other Embodiments

Although the techniques described herein use a reinforcement learning base agent, the techniques are applicable to any quantitative based learning technique. Accordingly, the system can use a machine learning technique for performing quantitative modeling of the population and perform group testing based on the quantitative modeling. The system may use the machine learning based model to implement a pooling strategy.

The machine learning based model for group testing is trained using either actual test results on a population or results obtained from a simulator. According to an embodiment, the machine learning based model receives as input certain pools of items representing a groups configuration for testing as well as the current defective items and information describing the population and ranks the groups. The machine learning based model determines a score for an input group configuration that indicates an effectiveness of the group configuration for performing the group testing. The ranking of the groups allows the system to try various combinations of groups by modifying the current group configuration and select a particular modification to the group configuration. Accordingly, the system evaluates various group configurations at each stage and modifies the current group configuration. The system selects a group configuration based on the score output by the machine learning based model. The system repeats this strategy repeatedly to determine the defective items. The process may be continued until a steady state is reached in terms of defective items detected from the population.

According to an embodiment, the system accesses a machine learning based model. The system initializes a set of pools of items from the population of items. The system performs group testing of the population of items using the machine learning based model by performing the following steps repeatedly. The system performs testing on the current pool of items to identify defective items. The system modifies the pool of items based on the result of the testing. The system evaluates the modified pool of items using the machine learning based model. The system determines whether to select or reject the modification to the pool of items based on the result of the machine learning based model. Once the group testing is complete, the system transmits the result of testing based on a final pool of items, the result identifying one or more defective items from the population of items.

Computer Architecture

Figure 8:
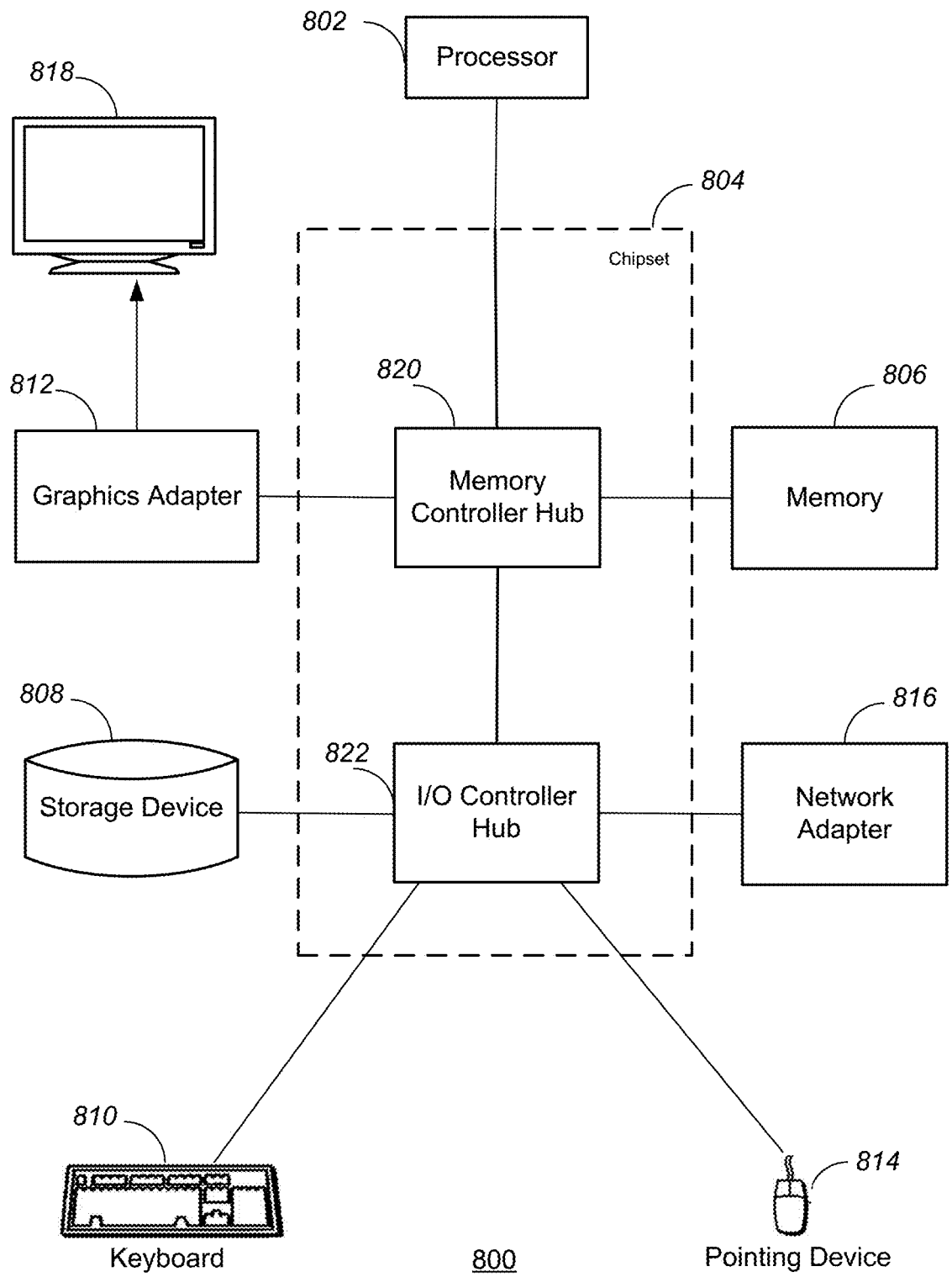
FIG. 8 is a high-level block diagram illustrating an example computer for implementing the client device and/or the computing system of FIG. 1.

FIG. 8 is a high-level block diagram illustrating an example computer for implementing the client device and/or the computing system of FIG. 1. The computer 800 includes at least one processor 802 coupled to a chipset 804. The chipset 804 includes a memory controller hub 820 and an input/output (I/O) controller hub 822. A memory 806 and a graphics adapter 812 are coupled to the memory controller hub 820, and a display 818 is coupled to the graphics adapter 812. A storage device 808, an input device 814, and network adapter 816 are coupled to the I/O controller hub 822. Other embodiments of the computer 800 have different architectures.

The storage device 808 is a non-transitory computer-readable storage medium such as a hard drive, compact disk read-only memory (CD-ROM), DVD, or a solid-state memory device. The memory 806 holds instructions and data used by the processor 802. The input interface 814 is a touch-screen interface, a mouse, track ball, or other type of pointing device, a keyboard, or some combination thereof, and is used to input data into the computer 800. In some embodiments, the computer 800 may be configured to receive input (e.g., commands) from the input interface 814 via gestures from the user. The graphics adapter 812 displays images and other information on the display 818. The network adapter 816 couples the computer 800 to one or more computer networks.

The computer 800 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 808, loaded into the memory 806, and executed by the processor 802.

The types of computers 800 used by the entities of FIG. 1 can vary depending upon the embodiment and the processing power required by the entity. The computers 800 can lack some of the components described above, such as graphics adapters 812, and displays 818. For example, the computing system 130 can be formed of multiple blade servers communicating through a network such as in a server farm.

Alternative Embodiments

It is to be understood that the Figures and descriptions of the disclosed invention have been simplified to illustrate elements that are relevant for a clear understanding of the present invention, while eliminating, for the purpose of clarity, many other elements found in a typical distributed system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method for performing group testing using reinforcement learning, the method comprising:
   receiving a population of items including a subset of defective items;
   receiving a request to identify defective items from the population of items;
   initializing a reinforcement learning based agent;
   initializing a set of pools of items from the population of items;
   performing group testing of the population of items using reinforcement learning, comprising:
      performing testing on a current pool of items to identify defective items;
      determining, by the reinforcement learning based agent, a reward based on results of the testing; and
      adjusting, by the reinforcement learning based agent, the current pool of items based on the reward; and
   transmitting a result of a final testing based on a final pool of items after the adjusting, the result of the final testing identifying one or more defective items from the population of items.

2. The computer implemented method of claim 1, wherein the reinforcement learning based agent is a neural network.

3. The computer implemented method of claim 2, wherein one or more layers of the neural network avoid a bias parameter.

4. The computer implemented method of claim 2, wherein the neural network is trained using training dataset having labels and wherein the labels are reweighted based on their inverse propensity weight.

5. The computer implemented method of claim 1, further comprising:
maintaining a tree of items that were part of the current pool of items.

6. The computer implemented method of claim 1, further comprising:
generating information describing prior probabilities of items of the population, the prior probability representing a likelihood of an item being defective.

7. The computer implemented method of claim 1, further comprising:
maintaining a tree of items that were linked though intermediate items sharing the current pool of items.

8. The computer implemented method of claim 1, further comprising:
training the reinforcement learning based agent using a simulator that represents the group testing, wherein the simulator receives one or more configuration parameters and behaves similar to the group testing responsive to changes in the one or more configuration parameters.

9. The computer implemented method of claim 8, wherein the simulator is configured to incorporate configuration parameters representing side information associated with the population of items.

10. The computer implemented method of claim 8, wherein a side information represents correlation between defective items in the population of items.

11. The computer implemented method of claim 8, wherein a side information represents distribution of prior on defective items in the population of items.

12. The computer implemented method of claim 8, wherein a side information represents one or more of sensitivity of the group test performed on the population of the items; or
specificity of the group test performed on the population of the items.

13. A computer implemented method for performing group testing using machine learning, the method comprising:
receiving a population of items including a subset of defective items;
receiving a request to identify defective items from the population of items;
accessing a machine learning based model;
initializing a set of pools of items from the population of items;
performing group testing of the population of items using the machine learning based model, comprising:
performing testing on a current pool of items to identify defective items;
modifying the current pool of items based on a result of the testing on the current pool of items;
evaluating the modified current pool of items using the machine learning based model;
determining whether to select or reject the modification to the pool of items based on the result of the machine learning based model; and
transmitting a result of a final testing based on a final pool of items, the result of the final testing identifying one or more defective items from the population of items.

14. The computer implemented method of claim 13, further comprising:
generating information describing prior probabilities of items of the population, the prior probability representing a likelihood of an item being defective.

15. The computer implemented method of claim 13, further comprising:
training a reinforcement learning based agent using a simulator that represents the group testing, wherein the simulator receives one or more configuration parameters and behaves similar to the group test responsive to changes in the one or more configuration parameters.

16. The computer implemented method of claim 15, wherein the simulator is configured to incorporate configuration parameters representing side information associated with the population of items, wherein a side information represents one or more of:
correlation between defective items in the population of items;
distribution of prior on defective items in the population of items; and
sensitivity of the group test performed on the population of the items or specificity of the group test performed on the population of the items.

17. A computer implemented method for performing non-adaptive group testing, the steps comprising:
receiving a population of items including a subset of defective items;
receiving a request to identify defective items from the population of items;
training a model using a simulator configured to perform simulated group testing, wherein the simulator receives configuration parameters representing side information describing the simulated group testing;
receiving values of parameters representing side information based on group testing of the population of items;
configuring the simulator using the received values of parameters;
performing a plurality of times, simulated group testing by executing the trained model using the configured simulator to obtain a plurality of actions, wherein an action represents a grouping of items;
selecting a subset of actions from the plurality of actions determining a pooling strategy for performing group testing based on at least the subset of actions selected from the plurality of actions; and
performing a group testing based on the pooling strategy to identify defective items from the population of items.

18. The computer implemented method of claim 17, wherein the subset of actions represents top actions selected from the plurality of actions based on a frequency of occurrence of each action in the plurality of actions.

19. The computer implemented method of claim 17, wherein the population of items represents one of: (1) a set of software tests; or (2) a set of hardware tests.

20. The computer implemented method of claim 17, wherein a side information represents one or more of:
correlation between defective items in the population of items;
distribution of priors on defective items in the population of items;
sensitivity of the group test performed on the population of the items; or
specificity of the group test performed on the population of the items.

* * * * *